United States Patent

[11] 3,582,920

[72] Inventor Shahbuddin A. Billawala
Thousand Oaks, Calif.
[21] Appl. No. 847,277
[22] Filed Aug. 4, 1969
[45] Patented June 1, 1971
[73] Assignee Burroughs Corporation
Detroit, Mich.

[54] SUPPORT DEVICE FOR MAGNETIC HEAD
18 Claims, 7 Drawing Figs.

[52] U.S. Cl. ........ 340/174.1, 179/100.2, 248/204, 267/158
[51] Int. Cl. ........ G11b 5/60, F16f 1/02
[50] Field of Search ........ 248/204; 267/158, 161, 163; 179/100.2 (P); 340/174.1 (E)

[56] References Cited
UNITED STATES PATENTS
3,310,792 3/1967 Groom et al. ........ 179/100.2

*Primary Examiner*—J. Russell Goudeau
*Attorney*—Christie, Parker & Hale

ABSTRACT: A support device for floating a magnetic head assembly on a fluid atmosphere is asymmetrically dimensioned so it assumes a positive angle of approach on application of a normal force at its center point by an actuating mechanism. The support device is a substantially flat, thin body structure of elastic material having perforations therein positioned and shaped to form a platform, an inner frame surrounding the platform, an outer frame surrounding the inner frame, a first pair of connecting members between opposite sides of the platform and the inner frame, and a second pair of connecting members between opposite sides of the inner frame and the outer frame disposed transverse to the first pair of connecting members. In one embodiment, the platform that supports the head assembly is permanently deformed to lie in a plane forward of and disposed at an acute angle to the remainder of the support device. In other embodiments, the length and/or width of opposite legs of the frames are unequal, thereby normally causing unbalanced deflection of the support device responsive to the actuating mechanism.

INVENTOR
SHAHBUDDIN A. BILLAWALA
BY
Christie, Parker & Hale
ATTORNEYS

SUPPORT DEVICE FOR MAGNETIC HEAD

BACKGROUND OF THE INVENTION

This invention relates to magnetic recording heads for reading and writing on a magnetic recording surface and, more particularly, to an improved support device for such magnetic heads.

R. G. Groom et al. U.S. Pat. 3,310,792, which issued Mar. 21, 1967, to the assignee of the present application, discloses a very effective support device for a magnetic head assembly. The support device comprises in a one piece construction a flat, thin slab of elastic material having perforations therein positioned and shaped to form a head mounting platform, an inner rectangular frame surrounding the platform, and an outer rectangular frame surrounding the inner frame. One pair of links connect opposite sides of the platform to the inner frame and another pair of links, which are transverse to the first pair, connect opposite sides of the inner frame to the outer frame. The head assembly is attached to the platform of the support device by a spacing block. The support device is secured to the stationary frame by mounting tabs that are also an integral part of the slab of elastic material. The head assembly is pushed into operating position in proximity to a rotating magnetic recording surface by the plunger of an actuating mechanism. My U.S. Pat. No. 3,320,599 discloses such an actuating mechanism, The plunger exerts a force on the platform of the support device in a normal direction, thereby deflecting the rectangular frames. When the head assembly is so placed in this operating position, the support device floats the head assembly so restrained rotation is permitted about the pivot point at the end of the plunger. In other words, the platform of the support device is rotatable about an axis in line with one pair of links and also is rotatable about a transverse axis in line with the other pair of links. On the other hand, the support device inhibits rotation of the head assembly about an axis perpendicular to the recording surface so essentially no skew takes place.

It has been found necessary to move the head assembly into operating position with a so-called positive angle of approach. In other words, as the head assembly moves into proximity to the rotating recording surface its trailing edge is closer to the recording surface than the leading edge. In this way, as the head assembly moves into operating position, an air film is developed that forms a fluid bearing. After the head assembly moves into operating position, it flattens out and floats on the air film under the restrained rotation permitted by the support device. My U.S. Pat. No. 3,320,599 discloses two techniques for imparting a positive angle of approach to the head assembly. One technique is to apply the force from the plunger to the platform of the support device at a point that is offset from the intersection of the axes of rotation, hereafter called the center point. However, this reduces the ability of the support device to rotate responsive to forces applied to the head assembly as it floats on the air film because the pivot point on the end of the plunger does not coincide with the center point of the support device. The other technique is to bond the spacing block for the head assembly off center on the platform of the support device. However, this is not practical from a manufacturing point of view. As further disclosed in my U.S. Pat. No. 3,320,599, these two techniques are also employed to compensate for radial differences in the pressure of the air film on the inside and outside edges of the head assembly.

SUMMARY OF THE INVENTION

The invention contemplates a support device for a magnetic head assembly that assumes a positive angle of approach when an actuating plunger applies a force to the support device at its center point without employing an offset spacing block. Broadly, this is achieved by constructing an asymmetrical support device. Consequently, the head assembly is supported with the greatest possible restrained rotational capability because the pivot point formed by the plunger coincides with the axes of rotation of the support device. Further, the cost of fabricating the superstructure is reduced and the packaging of the head assemblies is simplified.

In one embodiment of the invention, the platform of the support device is permanently deformed to lie forward of and disposed at an angle relative to the plane of the remainder of the support device. Thus, the support device is asymmetrical in that the portion of the platform on one side of the axis of rotation of the support device lies more forward than the portion on the other side of the axis of rotation. The angle between the platform and the remainder of the support device is the same as the desired angle of approach.

In other embodiments, the lengths and/or widths of opposite legs of the rectangular frames comprising the support device are unequal, thereby promoting unequal deflection of the portions of the frames on opposite sides of the axis of rotation.

BRIEF DESCRIPTION OF THE DRAWING

The features of several specific embodiments of the best mode contemplated of carrying out the invention are illustrated in the drawing, in which.

DETAILED DESCRIPTION OF THE SPECIFIC EMBODIMENTS

Figure 1:
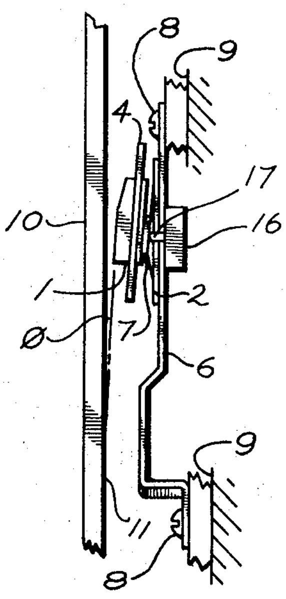
FIG. 1 is a side elevation view of a magnetic head assembly, its mounting apparatus, and a recording surface.

In FIG. 1 the components of a disc file information storage system are shown. A magnetic head assembly 1 is secured to a support device 2. Head assembly 1 contains a plurality of small, magnetic recording heads of a type conventionally used for reading and writing on rotating magnetic recording drums and discs. Head assembly 1 is held forward of support device 2 by a spacer 7, which could be a separate slab of material bonded to support device 2, as described in U.S. Pat. No. 3,310,792, or a permanently deformed portion of support device 2 itself, as described in my copending application Ser. No. 816,979, filed Apr. 17, 1969. A printed circuit board 4 is provided for mounting electronic switching circuits, which switch the output signals from the magnetic recording heads. Support device 2 has mounting tabs (not shown in FIG. 1) that secure it by screws (not shown in FIG. 1) to a stationary frame 6. Frame 6 is attached by screws 8 to a superstructure 9 near a magnetic recording surface 11 of a rotating magnetic disc 10. Disc 10 rotates at a high velocity and thereby forms an air film adjacent its recording surface upon which head assembly 1 floats while reading and writing.

Head actuating apparatus 16, which is mounted on superstructure 9, has a plunger 17 extending through an aperture in frame 6. Head actuating apparatus 16 could be constructed as shown in my U.S. Pat. No. 3,320,599. When plunger 17 is in its inactive position its end rests against support device 2 without deforming it. As a result, head assembly 1 is retracted from recording surface 11. When plunger 17 is actuated it moves to the left, as shown in FIG. 1, and forces support device 2 toward disc 10 to place head assembly 1 into operating position adjacent to recording surface 11. While head assembly 1 is being forced toward disc 10, it is given a positive angle of approach Φ by support device 2, as depicted in FIG. 1. Consequently, the air film on which head assembly 1 floats is properly developed and the possibility is eliminated that the leading edge of head assembly 1 may dip toward and move into contact with recording surface 11. Support device 2 is constructed to inhibit rotation of head assembly 1 about an axis perpendicular to the recording surface of disc 10 and to allow restrained rotation of head assembly 1 in other directions about a pivot point at the end of plunger 17 while head assembly 1 is floating.

The invention involves various asymmetrical constructions of support device 2 that provide the desired positive angle of approach of head assembly 1 responsive to the application of a force by plunger 17 at the point of intersection of the rotational axes of the support device in a normal direction. The term "a normal direction" is used in this specification to mean a direction perpendicular to the plane in which support device 2 lies when plunger 17 is not deforming it.

FIGS. 2 through 7 show various embodiments of support device 2. In each case the top of the support device as viewed in the drawing is the leading edge. These embodiments have certain parts in common that have the same reference numerals. Each embodiment of support device 2 could be fabricated by stamping it from a flat sheet of elastic metallic material so all the parts are formed in a one piece construction.

Figure 2:
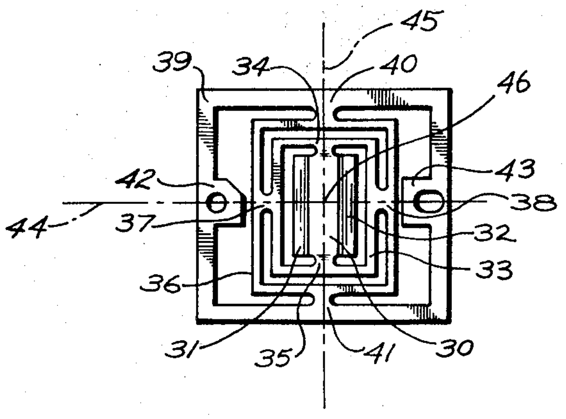
FIGS. 2 through 5 are front elevation views of embodiments of a magnetic head support device incorporating the principles of the invention.
Figure 6:
FIG. 6 is a side elevation view of the embodiments of FIGS. 2 through 5.

In FIG. 2 a rectangular platform 30 is shown. Platform 30 has permanently deformed forward portions 31 and 32 that lie in a plane forward of and parallel to the remainder of support device 2, as illustrated in FIG. 6. Portions 31 and 32 could be formed in a die. A rectangular inner frame 33 surrounds platform 30. Links 34 and 35, which lie on a vertical axis 45, connect opposite sides of platform 30 to inner frame 33. A rectangular intermediate frame 36 surrounds inner frame 33. Links 37 and 38, which lie on a horizontal axis 44, connect opposite sides of inner frame 33 to intermediate frame 36. Axis 44 is transverse to axis 45. A rectangular outer frame 39 surrounds intermediate frame 36. Links 40 and 41 connect opposite sides of intermediate frame 36 to outer frame 39. Links 40 and 41 also lie on axis 45 when the support device is not deformed. Mounting tabs 42 and 43 extend inwardly from outer frame 39. Magnetic head assembly 1 (FIG. 1) is bonded to portions 31 and 32. Thus, head assembly 1 is spaced from the remainder of the support device, which is secured to stationary frame 6 (FIG. 1) by screws that pass through the openings in tabs 42 and 43. When plunger 17 is actuated, its end pushes platform 30 toward recording surface 11. Since tabs 42 and 43 are fixed, frames 33, 36, and 39 deform so as to permit platform 30 to extend to the left as viewed in FIG. 1. While the head assembly is floating on the air film in its operating position, it is free to undergo restrained rotation about axis 44 by virtue of links 37 and 38 and about axis 45 by virtue of links 34 and 35 and links 40 and 41. As used in this specification, the term "center point," designated point 46 in FIG. 2, refers to the intersection of the two transverse axes of rotation of the support device. The end of plunger 17 contacts platform 30 at point 46. As a result, the most effective gimbal action for the size of the support device is obtained because the pivot point formed on the end of the plunger 17 lies on both axes of rotation of the support device.

In the embodiment of FIG. 2, the portions of the vertical legs of frames 33, 36 and 39 lying below axis 44 are longer than the portions of the vertical legs of frames 33, 36, and 39 lying above axis 44. This difference in length produces unequal deflections in both the horizontal and vertical legs of frames 33, 36, and 39 on opposite sides of axis 44. The portions of the vertical legs of frames 33, 36, and 39 below axis 44 are deflected more than the portions above axis 44 because the former are longer deflecting beams than the latter. The difference in length of the portions of the vertical legs on opposite sides of axis 44, however, also causes different deflecting forces to be applied to the horizontal portions on opposite sides of axis 44. A greater force is applied to the horizontal legs lying above axis 44. Therefore, they are deflected more than the horizontal legs lying below axis 44. This is explained by the rule that the product of force times the length of the lever arm on opposite sides of a balanced pivot point is the same. Frames 33, 36, and 39 are so dimensioned in the embodiment of FIG. 2 that the difference in deflection of the horizontal legs is greater than the difference in deflection of the portions of the vertical legs. Consequently, as the end of plunger 17 applies a force to center point 46 of platform 30 in a normal direction, the bottom half of platform 30 tilts forward with respect to the top half so the head assembly assumes the desired positive angle of approach.

Figure 3:
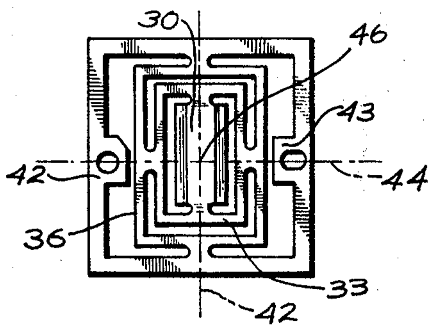

In the embodiment of FIG. 3, the vertical portions of frames 33, 36, and 39 above axis 44 are longer than the vertical portions below axis 44. However, frames 33, 36, and 39 are so dimensioned in this embodiment that the difference in the deflection of the vertical portions is greater than the difference in the deflection of the horizontal portions. Therefore, the bottom half of platform 30 tilts forward away from the plunger as the normal force is applied thereto at center point 46.

Figure 4:
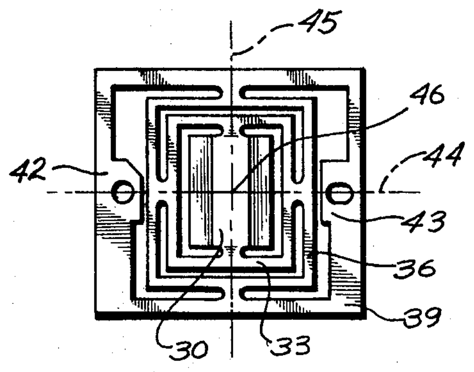

The upper portions of the vertical legs of outer frame 39 of the support device of FIG. 4 are narrower in width than the lower portions thereof. As a result, the upper vertical portions deflect more than the lower vertical portions so the bottom half of platform 30 tilts forward more than the top half as the normal force is applied thereto at center point 46. It is to be noted that in this embodiment the horizontal legs of the frames on opposite sides of axis 44 deflect equally.

Figure 5:
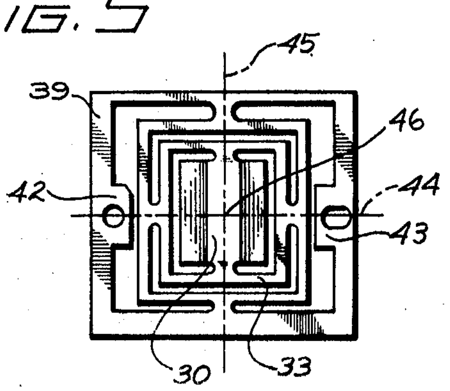

The upper horizontal leg of outer frame 39 in the embodiment of FIG. 5 is narrower in width than the lower horizontal leg thereof. As a result, the upper horizontal leg deflects more than the lower horizontal leg responsive to the application of the normal force to platform 30 at center point 46. Analogous to the embodiment of FIG. 4, the portions of the vertical legs of the frames above and below axis 44 deflect equally in the embodiment of FIG. 5.

Figure 7:
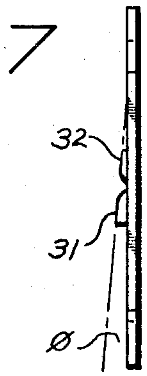
FIG. 7 is a side elevation view of another embodiment of a magnetic head support device incorporating the principles of the invention.

In each of the embodiments of FIGS. 2 through 5, the positive angle of approach is obtained by constructing the support device so it is unsymmetrical about axis 44, and employing a platform having permanently deformed portions that lie in a plane parallel to the remainder of the support device, as illustrated in FIG. 6. In this way, unsymmetrical deflection characteristics are imparted to the portions of the support device on opposite sides of axis 44. Alternatively, the positive angle of approach could be obtained upon application of a normal force to center point 46 by permanently deforming portions 31 and 32 to lie in a plane disposed at an acute angle $\Phi$ to the remainder of the support device, as illustrated in FIG. 7. The angle that deformed portions 31 and 32 form with the remainder of the support device is substantially identical to the desired angle of approach of the head assembly. Thus, in this embodiment, the positive angle of approach is also obtained by constructing the support device so it is unsymmetrical, in this case about the normal direction. However, the deflection characteristics of the portions of the support device on opposite sides of axis 44 are the same. It is to be noted that the embodiment of FIG. 7 is rotated ninety degrees from those of FIGS. 2 through 6, i.e., tabs 42 and 43 are aligned with the vertical axis and the tangential velocity of the disc and portions 31 and 32 are aligned with the horizontal axis.

The underlying concept of the invention is that a lack of symmetry in a support device fabricated from a single piece of elastic material is utilized to obtain the positive angle of approach. This distinguishes from the techniques known to the prior art, wherein either the force is applied to the support device at a point off center or a separate spacer for the head assembly is mounted to the support device in off center relationship.

Although it is preferable to employ a permanently deformed portion of the platform of support device 2 to space head assembly 1 from the remainder of support device 2, the invention also encompasses with the techniques of FIGS. 2 through 5 the use of a separate spacer that is bonded to the head assembly 1 and support device 2 in centered relationship as disclosed in U.S. Pat. No. 3,310,792. It is also to be noted that the embodiment of FIG. 7 could be implemented with a separate spacer that is bonded to the head assembly and symmetrical support device.

Although the invention is illustrated in a support device having a plurality of frames and perforations, it can be incorporated into a wide variety of types of magnetic head support devices some of which may only have one frame and one perforation.

What I claim is:

1. In combination, a magnetic recording means including a recording surface moving in a fluid atmosphere, a magnetic head assembly adapted for floating on the fluid atmosphere, a support device having a platform coupled to said head assembly, means for supporting the support device with the head assembly oriented adjacent the recording surface, and an actuating member having an end for engaging the support device at a pivot point and forcing the head assembly into a floating position on the fluid atmosphere adjacent the moving recording surface, the support device including in a one-piece construction an approximately flat, thin, unsymmetrical body structure comprising an elastic material perforated to form the platform and a supporting network therefor that inhibits rotation of the head structure about an axis perpendicular to the recording surface, allows restrained rotation of the head assembly in other directions about first and second axes that intersect at the pivot point, and to allow movement of the head assembly toward and away from the recording surface with a positive angle of approach responsive to the force of the actuating member exerted at the pivot point, a portion of the platform being permanently deformed to lie forward of the remainder of the body structure, the head assembly being fixed to the permanently deformed portion so it is spaced from the remainder of the body structure.

2. The combination of claim 1, in which the permanently deformed portion of the platform lies in a plane disposed at an acute angle to the remainder of the body structure.

3. The combination of claim 1, in which the body structure is perforated to form a first frame surrounding the platform, a first pair of connecting members along the first axis of rotation between opposite sides of the first frame and the platform, a second frame surrounding the first frame, a second pair of connecting members along the second axis of rotation between opposite sides of the second frame and the first frame, the dimensions of the frames being unsymmetrical in such a way as to produce a positive angle of approach for the head assembly responsive to the force applied thereto by the actuating member.

4. The combination of claim 3, in which one frame is rectangular, one axis of rotation is perpendicular to the direction of movement of the recording surface and perpendicular to two legs of the one frame, and the portions of the two legs of the one frame lying on one side of the one axis are longer than the portions of the two legs lying on the other side of the one axis.

5. The combination of claim 3, in which one frame is rectangular, one axis of rotation is perpendicular to the direction of movement of the recording surface and perpendicular to two legs of the one frame, and the portions of the two legs lying on one side of the one axis are wider than the portions of the two legs lying on the other side of the one axis.

6. The combination of claim 3, in which one frame is rectangular, one axis of rotation is perpendicular to the direction of movement of the recording surface and parallel to two legs of the one frame, and one of the two legs is wider than the other.

7. In combination, a magnetic recording means including a recording surface moving in a fluid atmosphere, a magnetic head assembly adapted for floating on the fluid atmosphere, a support device having a platform coupled to said head assembly, means for holding the head assembly in spaced relationship from and disposed at an acute angle to the support device, means for supporting the support device with the head assembly oriented adjacent the recording surface, and an actuating member having an end for engaging the support device at a pivot point and forcing the head assembly into a floating position on the fluid atmosphere adjacent the moving recording surface, the support device including in a one-piece construction an approximately flat, thin body structure comprising an elastic material perforated to form the platform and a supporting network therefor that inhibits rotation of the head structure about an axis perpendicular to the recording surface, allows restrained rotation of the head assembly in other directions about first and second axes that intersect at the pivot point, and to allow movement of the head assembly toward and away from the recording surface with a positive angle of approach responsive to the force of the actuating member exerted at the pivot point.

8. The combination of claim 7, in which the holding means is a permanently deformed portion of the platform having a surface at an acute angle to the support device to which the head assembly is bonded.

9. A device arranged for guiding and supporting a magnetic recording head with respect to a fluid atmosphere adjacent a moving magnetic recording surface comprising a thin, approximately flat elastic body having in a one-piece construction a head support platform a portion of which is permanently deformed to lie in a plane spaced from the remainder of the elastic body, an inner support member disposed around the inner support member, a first pair of connecting members between opposite sides of the platform and the inner support member along a first axis of rotation, a second pair of connecting members between opposite sides of the inner support member and the outer support member along a second axis of rotation, and means disposed along one of the axes for securing the outer frame to a superstructure, the connecting members and support members inhibiting rotation of the head support member relative to the plane of the flat body but causing the elasticity of the body to permit restrained rotational movement of the head support member about the first and second axes, the flat elastic body being unsymmetrically constructed so that upon application of a force at the intersection of the first and second axes of the flat elastic body in a normal direction the portions of the body on one side of one axis are deformed more than the portions of the body on the other side of the one axis to produce a forward tilt.

10. The device of claim 9, in which the plane in which the permanently deformed portion of the platform lies forms an acute angle with the remainder of the flat body.

11. The device of claim 9, in which at least one support member is unsymmetrically dimensioned about the one axis.

12. The device of claim 11, in which the first and second support members and the platform are substantially rectangular, two legs of each support member are perpendicular to the one axis, and the portions of the legs of the support members on one side of the one axis are longer than the portions of the legs of the support members on the other side of the one axis.

13. The device of claim 11, in which the first and second support members and the platform are rectangular, two legs of each support member are perpendicular to the one axis, and the portions of the legs on one side of the one axis are wider than the portions of the legs on the other side of the one axis.

14. The device of claim 11, in which the first and second support members and the platform are rectangular, two legs of each support member are parallel to the one axis, and the legs of the support members on one side of the one axis are wider than the legs of the support members on the other side of the one axis.

15. A support device comprising in a one-piece construction a load support member, a portion of the load support member being permanently deformed so it lies in a plane displaced from the remainder of the load support member, and an elastic interconnecting network surrounding and coupled to the load support member such that the elasticity thereof allows restrained rotational movement of the load support member about first and second axes that intersect at a pivot point and the elastic members inhibit movement of the load support member parallel with the plane defined by the axes, the one piece construction being unsymmetrical about one axis such that upon application of a force in a normal direction to the load support member at the pivot point the load support member moves away from the network of elastic members with a tilt relative to the plane defined by the axes.

16. In combination, a magnetic recording means including a recording surface moving in a fluid atmosphere, a magnetic head assembly adapted for floating on the fluid atmosphere, a support device having a platform coupled to said head assembly, means for supporting the support device with the head assembly oriented adjacent the recording surface, and an actuating member having an end for engaging the support device at a pivot point and forcing the head assembly into a floating position on the fluid atmosphere adjacent the moving recording surface, the support device including in a one-piece construction a thin body structure comprising an elastic material perforated to form the platform and a supporting network therefor that inhibits rotation of the head structure relative to the recording surface and allows restrained rotation of the head assembly in other directions about first and second axes that intersect at the pivot point, the supporting network having unsymmetrical deflection characteristics on opposite sides of one axis to allow movement of the head assembly toward and away from the recording surface with a positive angle of approach responsive to the force of the actuating member exerted at the pivot point.

17. A device arranged for guiding and supporting a magnetic recording head with respect to a fluid atmosphere adjacent a moving magnetic recording surface comprising a thin elastic body having in a one-piece construction a head support platform, an inner support member disposed around the platform, an outer support member disposed around the inner support member, a first pair of connecting members between opposite sides of the platform and the inner support member along a first axis of rotation, second pair of connecting members between opposite sides of the inner support member and the outer support member along a second axis of rotation, and means disposed along one of the axes for securing the outer frame to a superstructure, the connecting members and support members inhibiting rotation of the head support member relative to the plane of the flat body but causing the elasticity of the body to permit restrained rotational movement of the head support member about the first and second axes, the support members being constructed with unsymmetrical deflection characteristics on opposite sides of one axis so that upon application of a force at the intersection of the first and second axes of the elastic body in a normal direction the portions of the body on one side of the one axis are deformed more than the portions of the body on the other side of the one axis to produce a forward tilt about the one axis.

18. A support device comprising in a one-piece construction a load support member, and an elastic interconnecting network surrounding and coupled to the load support member such that the elasticity thereof allows restrained rotational movement of the load support member about first and second axes that intersect at a pivot point and inhibits movement of the load support member parallel with the plane defined by the axes, the interconnecting network having unsymmetrical deflection characteristics on opposite sides of one axis such that upon application of a force in a normal direction to the load support member at the pivot point the load support member moves away from the network of elastic members with a tilt about the one axis.